J. MARK & E. N. MOHL.
GRATING.
APPLICATION FILED JULY 1, 1914.
1,132,021.
Patented Mar. 16, 1915.
3 SHEETS—SHEET 1.
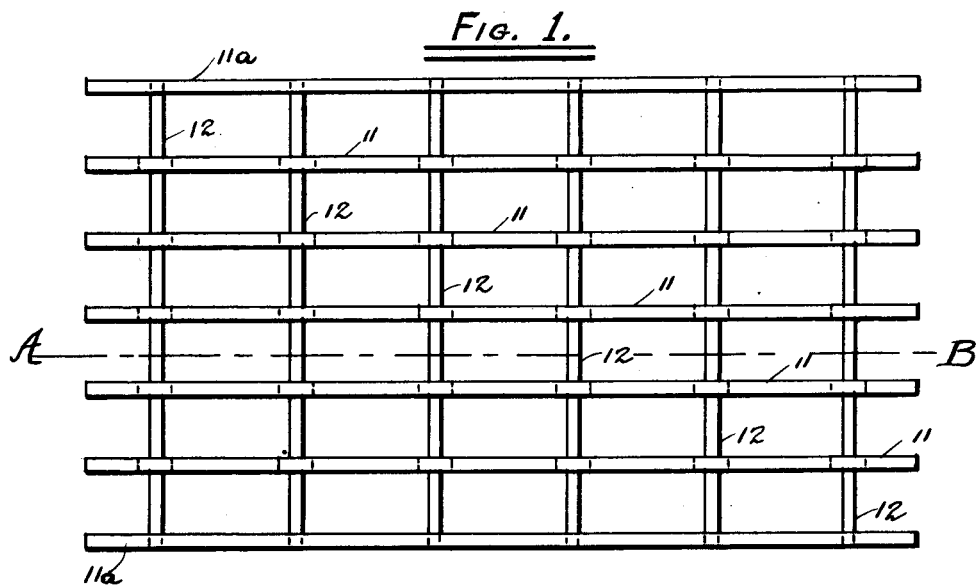
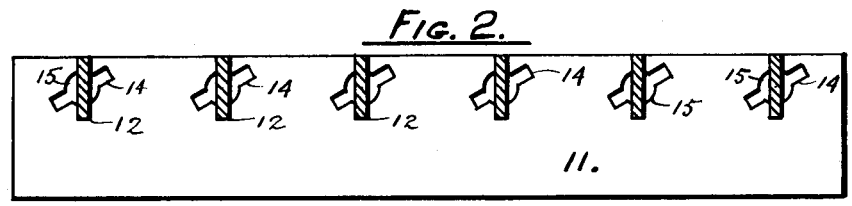
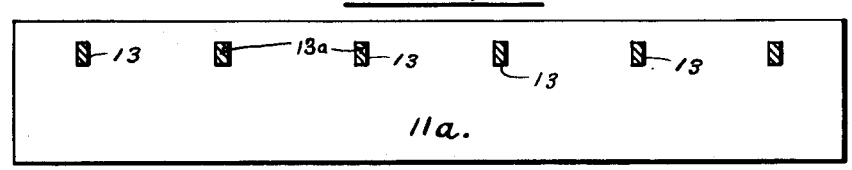
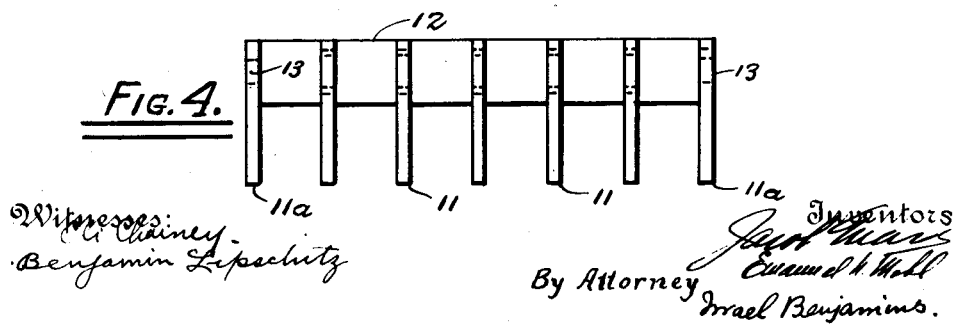

J. MARK & E. N. MOHL.
GRATING.
APPLICATION FILED JULY 1, 1914.
1,132,021.
Patented Mar. 16, 1915.
3 SHEETS—SHEET 2.
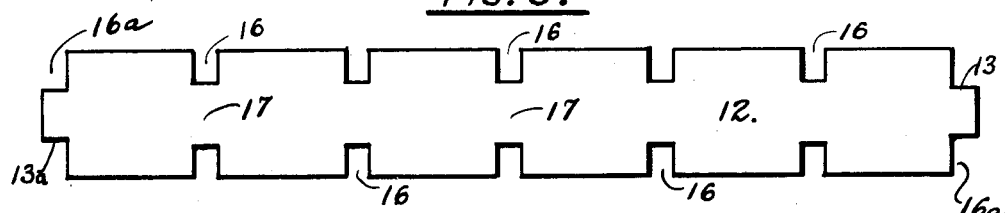
Fig. 5.
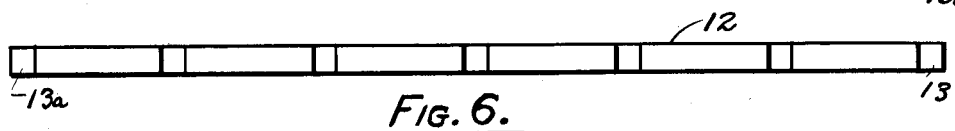
Fig. 6.
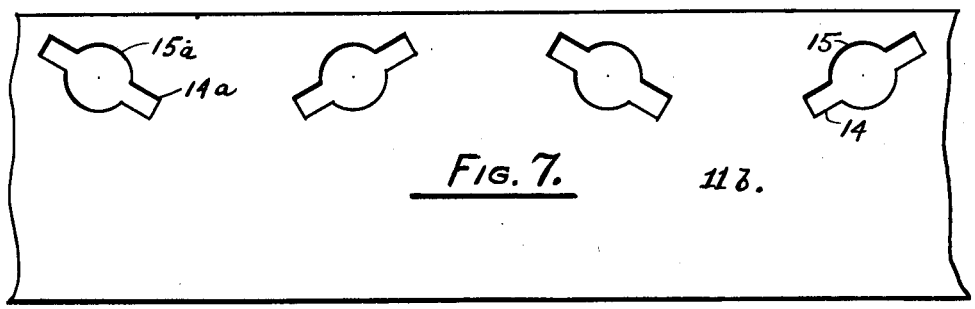
Fig. 7.
Fig. 8.
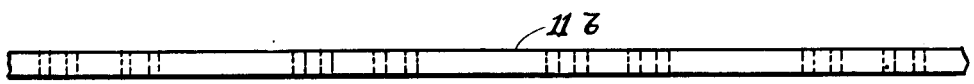
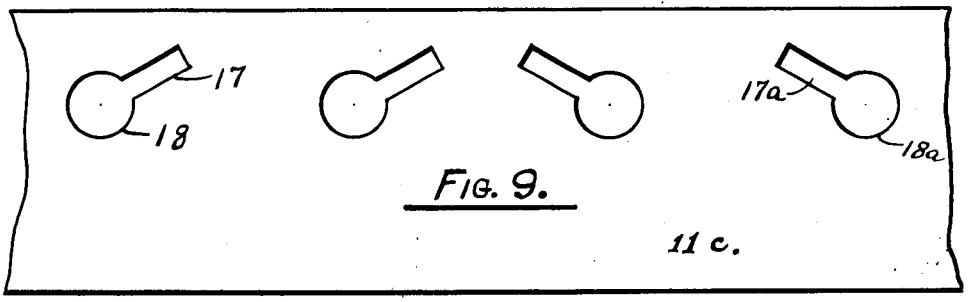
Fig. 9.
Fig. 10.
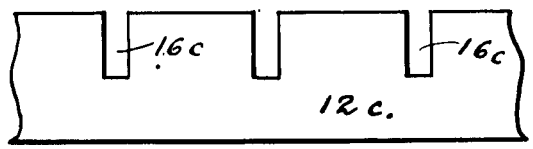

J. MARK & E. N. MOHL.
GRATING.
APPLICATION FILED JULY 1, 1914.
1,132,021.
Patented Mar. 16, 1915.
3 SHEETS—SHEET 3.
Fig. 11.
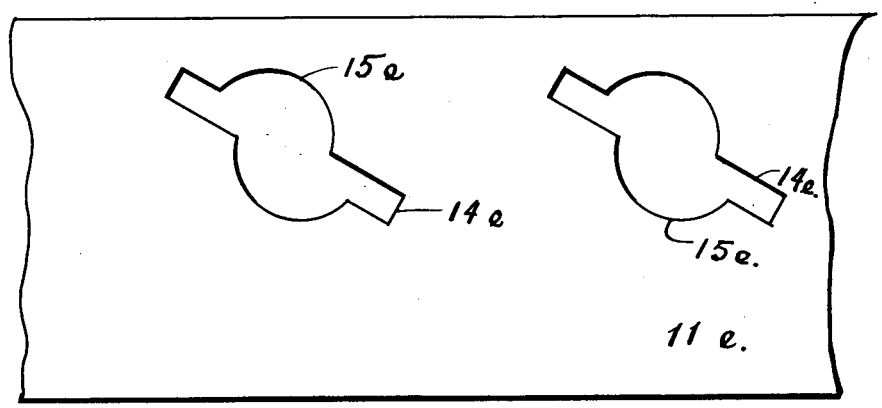
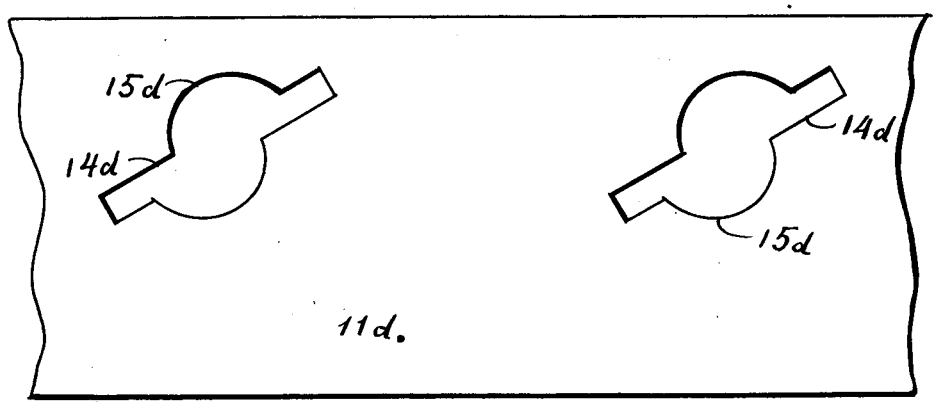
Fig. 12.
Witnesses:
Inventors:
Jacob Mark and Emanuel N. Mohl.
By Attorney
Israel Benjamins, M.E.

UNITED STATES PATENT OFFICE.

JACOB MARK, OF BROOKLYN, AND EMANUEL N. MOHL, OF NEW YORK, N. Y., ASSIGNORS TO MARK & MOHL, INC., OF BROOKLYN, NEW YORK.

GRATING.

1,132,021.   Specification of Letters Patent.   Patented Mar. 16, 1915.

Application filed July 1, 1914. Serial No. 848,403.

*To all whom it may concern:*

Be it known that we, JACOB MARK, residing at 8629 Twenty-fourth avenue, Brooklyn, in the county of Kings and State of New York, and EMANUEL N. MOHL, residing at 205 Henry street, New York, in the county and State of New York, have invented a new and useful Grating, of which the following is a specification.

Our invention relates to improvements in gratings used for areaways, sidewalk openings, subway coverings, fire-escape treads and platforms, guards for windows or openings in walls, openings in interiors of structures and for similar purposes.

It consists in the novel features hereinafter more fully described.

The objects of our improvement are, first, to produce a grating of great strength and durability with a minimum expense of material and labor; second, to produce a grating of attractive appearance; third, to produce a grating, which is comparatively free from dirt and obstructions accumulating in its passages and between its bars. We attain these objects by the grating, one form of which is illustrated in the accompanying drawings, in which—

Figure 1 is a plan, Fig. 2 is a section by a plane passing through the line A—B of Fig. 1; Fig. 3 is an outside view in a plane parallel to A—B; Fig. 4 is an end view of the grating shown in Fig. 1; Fig. 5 is an elevation of the detail 12; Fig. 6 is a plan of said detail 12; Fig. 7 is an elevation of part of detail 11$^b$, which is a modified form of detail 11; Fig. 8 is a plan of said modified detail 11$^b$; Fig. 9 is an elevation of part of detail 11$^c$, which is another modified form of detail 11; Fig. 10 is an elevation of part of detail 12$^c$, which is a modified form of detail 12. Figs. 11 and 12 are elevations of part of detail 11 showing forms of slots 14 and enlargements 15.

Similar numerals and letters refer to similar parts throughout the several views.

Our grating as shown, is formed of substantially two sets of bars, as follows:

1. Longitudinal or bearer bars 11 and 11$^a$, the latter being of the same outward dimensions as the former, but having slots of a different form punched or otherwise formed in them. The bars 11 have slots 14 and enlargements 15 of the same slots; the bars 11$^a$, which are placed on the sides of the grating have mortises 13 punched or formed in them.

2. Transverse or spacing bars 12, having notches 16 and 16$^a$ on both edges, said notches being opposite to each other, and the necks 17, formed between said notches 16, are about equal in depth to the diameter or depth of the enlargements 15 of the slots 14 of the bearer bars 11.

The length of the slots 14 is about equal to the depth of the bars 12. The tenons 13$^a$ at the ends of the spacing bars 12 and contained between the notches 16$^a$, are of the same size and form as the mortises 13 in the bearer bars 11$^a$.

To assemble the grating the bars 12 are passed through the slots 14 of the bars 11 in an inclined position until their notches 16 coincide with the thickness of the bars 11; then the said bars 12 are turned into a vertical position, the necks 17 revolving in the enlargements 15 of the slots 14, and the strips of the said bars 12 contained between the notches 16 are thereby raised until their upper edges are flush with the surface of the grating. The tenons 13$^a$ at the ends of the bars 12 are then inserted into the corresponding mortises 13 of the bars 11$^a$, and they are slightly upset or expanded after insertion to make the entire grating rigid.

The bars 12, while fitting loosely in the slots 14 of the bars 11, have their notches 16 formed to a driving fit with the said bars 11; the enlargements 15 of the slots 14 may also be formed slightly spiral, as shown in an exaggerated form in Fig. 12, or eccentrical, as shown also in an exaggerated form in Fig. 11, instead of round, as shown in Figs. 2 and 7; the curves 15$^d$, which form the boundaries of the enlargements in Fig. 12, are Archimedean spirals; the curves 15$^e$, which form the boundaries of the enlargements in Fig. 11, are arcs of circles, the centers of which are situated to one side of the centers of the slots 14$^e$; the boundaries of the enlargements 15 and 15$^a$ in Figs. 2 and 7 are arcs of circles, the centers of which coincide with the centers of the slots 14 and 14$^a$, so that the necks 17 of the bars 12 may fit loosely when the said bars 12 are first passed through said slots 14, and the fit be gradually tightened as the said bars 12 and necks 17 are revolved into a vertical position, as hereinbefore described.

In Fig. 2 the slots 14 of the bars 11 are inclined all in the same direction; Figs. 7 and 9 show modified forms of the bearer bars, in which the said slots 14 are inclined in different directions. The slots may also be horizontal, if desired.

Fig. 9 shows a modification, in which the enlargement 18 of the slot 17 is situated at the lower end of the said slot, instead of being in the middle of the slot, as is shown in Figs. 2 and 6.

Fig. 10 shows a modified form of a spacing bar 12°, which has notches on one edge only; this spacing bar 12° is designed to fit the bearer bar 11° of Fig. 9.

Many other modifications could be made in our grating without departing from the main scope of our invention. We do not therefore restrict ourselves to the exact shape of our grating as shown in the drawing, nor to the exact shape of any of the details shown; but we intend to include all mechanical equivalents and obvious modifications of the same.

What we claim as our invention and desire to secure by Letters Patent is:

A grating comprising bearer bars and spacing bars passing through the bearer bars, said bearer bars having slots in them at an angle to the normal position of the spacing bars, said spacing bars having necks passing through the slots, said slots having cam-shaped enlargements in them whereby the necks of the spacing bars are tightened in the enlargements upon rotation of the spacing bars into normal position.

JACOB MARK.
EM. N. MOHL.

Witnesses:
BENJAMIN KRONENBERG,
REGINA N. MARKEWICH.